United States Patent
Weiler et al.

[19]

[11] Patent Number: 5,936,318
[45] Date of Patent: Aug. 10, 1999

[54] POWER DISTRIBUTION ARRANGEMENT ESPECIALLY IN AN AIRCRAFT

[75] Inventors: Werner Weiler, Colomiers, France; Michael Krumbholz, Horst, Germany

[73] Assignee: DaimlerChrysler Aerospace Airbus GmbH, Hamburg, Germany

[21] Appl. No.: 08/892,420

[22] Filed: Jul. 14, 1997

[51] Int. Cl.$^6$ .................................................. H02J 7/00
[52] U.S. Cl. ........................... 307/66; 307/18; 307/23; 307/80; 364/492
[58] Field of Search .................. 307/64, 66, 65, 307/80, 85, 86, 87, 93, 44, 18, 19, 23, 24; 364/492, 480

[56] References Cited

U.S. PATENT DOCUMENTS

| | | | |
|---|---|---|---|
| 4,403,292 | 9/1983 | Ejzak et al. | 364/492 |
| 4,730,089 | 3/1988 | Pepper | 191/12.4 |
| 4,967,096 | 10/1990 | Diemer et al. | 307/19 |
| 5,594,285 | 1/1997 | Wisbey et al. | 307/18 |
| 5,729,059 | 3/1998 | Kilroy et al. | 307/84 |

*Primary Examiner*—Jeffrey Gaffin
*Assistant Examiner*—Jonathan S. Kaplan
*Attorney, Agent, or Firm*—W.F. Fasse; W.G. Fasse

[57] ABSTRACT

A power distribution arrangement, especially in an aircraft, includes plural power sources, a power line having plural power supply strands connected to the power sources, plural power consumer groups each including plural power consuming devices, and branch lines respectively connecting the power line with the power consumer groups. A respective allocation unit selectively interconnects the power consuming devices of each group with selected individual branch line strands of the branch lines. A status unit acquires information regarding the respective operating status of the power sources and the power line strands, and conveys corresponding information regarding a power failure on any power line strand to a central power control unit, which correspondingly transmits control commands over a control bus to the respective allocation units. In response to the control commands, each allocation unit automatically disconnects power consuming devices from any power line strand that has failed and reconnects the devices to another power line strand that is still operating properly. In this manner, the allocation of power consuming devices to the several power line strands can be reconfigured automatically or by manual inputs without requiring a mechanical rearrangement of power system components, and it is possible to a large extent to ensure that power will continue to be provided to important power consuming devices despite the failure of any one or more power supply circuits or branches.

19 Claims, 3 Drawing Sheets

POWER DISTRIBUTION ARRANGEMENT ESPECIALLY IN AN AIRCRAFT

FIELD OF THE INVENTION

The invention relates to an energy or power distribution arrangement, especially in an aircraft, in which a group of electrical power consuming devices is connected via a branch line to a power distributor connected along the length of a power line including a plurality of power supply strands or conductors.

BACKGROUND INFORMATION

Power distribution arrangements of the above general type are used in aircraft to distribute the electrical energy or power available in the power supply system to the individual power consuming devices. For reasons of safety and redundancy, a plurality of independent power sources are provided and are connected to individual power line strands. Furthermore, the various power consuming devices are permanently or fixedly allocated and connected to particular ones of the power sources through the branched cabling of the power supply system, according to a generally typical manner of power distribution.

In the known systems, if one branch of the power supply fails, for example due to failure of the power source connected to this branch or failure of the branch conductor itself, then the power supply to all power consuming devices connected to this branch will be interrupted. Even though the other power sources and power distribution branches continue functioning due to the above described redundancy, if one power distribution branch fails then all devices connected to that branch will fail. Even critical devices connected to the failing branch will lose their supply of power and will be shut down, even though the remaining power available in the other power distribution branches is not being fully utilized by the remaining connected power consuming devices. It can also occur that an important power consuming device is shut down due to lack of power while a relatively unimportant power consuming device is still being supplied with electrical power through a properly functioning power distribution branch.

SUMMARY OF THE INVENTION

It is the aim of the invention to provide a power distribution arrangement that avoids the disadvantages of the prior art and achieves further advantages as discussed herein. Particularly, it is an object of the invention to provide a power distribution system and method for operating the same, whereby the allocation and connection of power consuming devices to the individual branches or strands of a power supply system can be altered or reallocated based on predefined rules and priorities, and on operator input, during operation of the power system.

The above objects have been achieved in a power distribution arrangement according to the invention in which an allocation unit is provided for each power consumer group. On the one hand, the allocation unit is connected by branch line strands to all of the individual power supply strands of the power line, and on the other hand, the allocation unit is also connected to each of the individual power consuming devices included in the power consumer group. Moreover, a status unit acquires data relating to the operating status or condition of the power generating sources and the power line strands, and from this acquired data provides malfunction or failure information to a central power control unit connected thereto. The control unit in turn processes the failure information and transmits control commands over a control bus to the allocation units. On the basis of the control commands, the allocation units will automatically reallocate the connections of power consuming devices if necessary, such that any devices that were connected to a power line strand affected by a power failure will instead be connected to another power line strand that is still intact and properly providing power. In this manner, the present power distribution arrangement automatically switches at least critical power consuming devices from a failed power line strand to a still-operating power line strand.

A particular advantage according to the invention is that the power supply to important devices is, to a large extent, reliably assured despite the failure or power loss in any one or more of the individual strands of the power line, as long as at least one power line strand is still providing power. Moreover, the allocation of various power consuming devices to the various power line strands can be adjusted during operation of the power distribution arrangement, in order to balance the power demands with the power available on any particular power line strand. In this manner, the available power and particularly the operating power sources can be utilized most efficiently, and under certain operating conditions it may be possible to shut down one or more of the power sources while still operating all of the necessary power consuming devices from the power provided by the remaining power sources. The switching or reallocation of power consuming devices to the particular power line strands can be carried out automatically based on defined rules or priorities, and/or can be carried out manually by operator input.

To carry out the reallocation, the central power control unit preferably includes a priority matrix, a standard matrix, a selection processor, a transmitting unit, and a load reply signal unit. Each allocation unit preferably includes a receiver stage, a load monitor, an allocation control unit, a power switch device, and a load sensor. Furthermore, the allocation unit preferably includes a status unit. The arrangement may further comprise an operator input unit having a keyboard and a display screen, which is connected via an input line to the power control unit.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
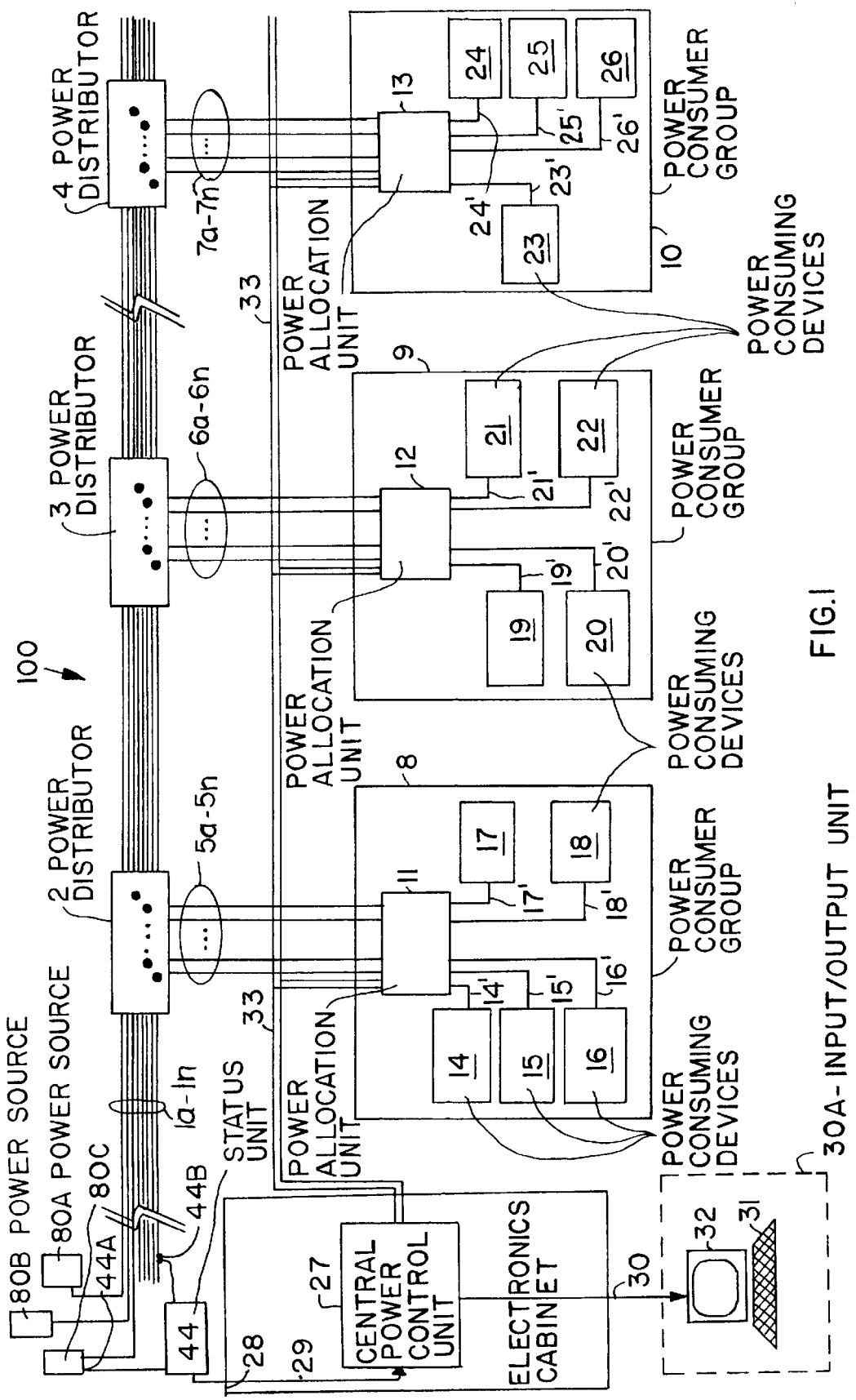
FIG. 1 is a block circuit diagram of a power distribution arrangement including a power control unit and a plurality of allocation units according to the invention.

FIG. 1 shows an example embodiment of an energy or power distribution arrangement 100 according to the invention. In this example embodiment, the power distribution arrangement 100 is a power supply system for the on-board galleys in an aircraft. The apparatus 100 includes a plurality of power sources 80a, 80b, and 80c such as batteries and turbine-driven generators, and a power line 1 comprising a plurality of individual power supply strands or conductors 1a to 1n connected to the power sources. A plurality of power distributors 2, 3 and 4 are arranged along the length of the power line 1. A plurality of power consumer groups 8, 9 and 10 are connected by respective branch lines 5, 6 and 7 to the respective power distributors 2, 3 and 4. Namely, a plurality of branch line strands 5a to 5n forming the branch line 5 respectively connect the power consumer group 8 to the individual power supply strands 1a to 1n, while branch line strands 6a to 6n connect the power consumer group 9 to the power supply strands 1a to 1n, and branch line strands 7a to 7n connect the power consumer group 10 to the power supply strands 1A to 1N.

Each one of the power consumer groups 8, 9 and 10 includes at least one, but usually a plurality, of individual power consuming devices 14 to 26. Within each one of the power consumer groups 8, 9 and 10, a respective allocation unit 11, 12, and 13 on the one hand is connected to the power supply strands 1a to 1n of the power line 1 via the branch lines 5, 6, and 7 as described above, and on the other hand is connected to the individual power consuming devices of the respective power consumer group. More specifically, the power consuming devices of each power consumer group are the devices provided within each one of the respective on-board galleys or kitchens of the aircraft. For example, the power consumer group 8 includes the power consuming devices provided in a first galley, namely ovens 14, 17 and 18, a boiler 15, and a refrigerator or cooler box 16. Similarly, the power consumer group 9 includes a boiler 19, two ovens 20 and 21 and a cooler box 22 provided in a second galley, and the power consumer group 10 includes a boiler 23 and three ovens 24 to 26 in a third galley. The devices 14 to 26 are respectively connected to feeder lines 14' to 26', which in turn are connected group-wise to the allocation units 11, 12 and 13.

In order to control the operation of the power distribution arrangement, a central power control unit 27 is arranged in an electronics cabinet or electronics room 28. A data line 29 and an input line 30 are connected to the power control unit 27. The data line 29 serves to provide automatically acquired information regarding the operating condition or status of the power line 1 as an input into the power control unit 27. The input line 30 connects the power control unit 27 with an input/output unit 30a which essentially includes a keyboard 31 and a display screen 32 for manually inputting configuration data and displaying status data regarding the operation of the system. On the output side, the power control unit 27 is connected with the allocation units 11 to 13 by a bi-directional control bus 33.

During operation of the system, the individual power consuming devices 14 to 26 of a power consumer group 8, 9 and 10 are connected by means of the associated allocation unit 11, 12, and 13 to certain prescribed power supply strands 1a to 1n of the power line 1 according to predetermined allocation configurations.

This is achieved by transmitting corresponding digital control data from the power control unit 27 over the control bus 33 to individual digitally actuatable power switches included in the respective allocation units 11, 12 and 13 as will be described below. The respective selected allocation configuration is stored within the power control unit 27, and may be selected or altered by inputting data on the keyboard 31. In this manner, it is possible to alter the allocation of the power consuming devices respectively to the individual power supply strands by a simple command input, without requiring mechanical changes in the power system installation as has previously been necessary. Any new configuration can be achieved as desired according to the invention in an automatic manner depending upon the respective status of the power supply system. Thus, the allocation units 11, 12 and 13, and particularly the power switches 42 included therein as described below, each form a selective interconnection switching junction or means for selectively interconnecting the feeder lines 14' to 26' on the one hand and the branch line strands 5a to 5n, 6a to 6n and 7a to 7n on the other hand.

Figure 2:
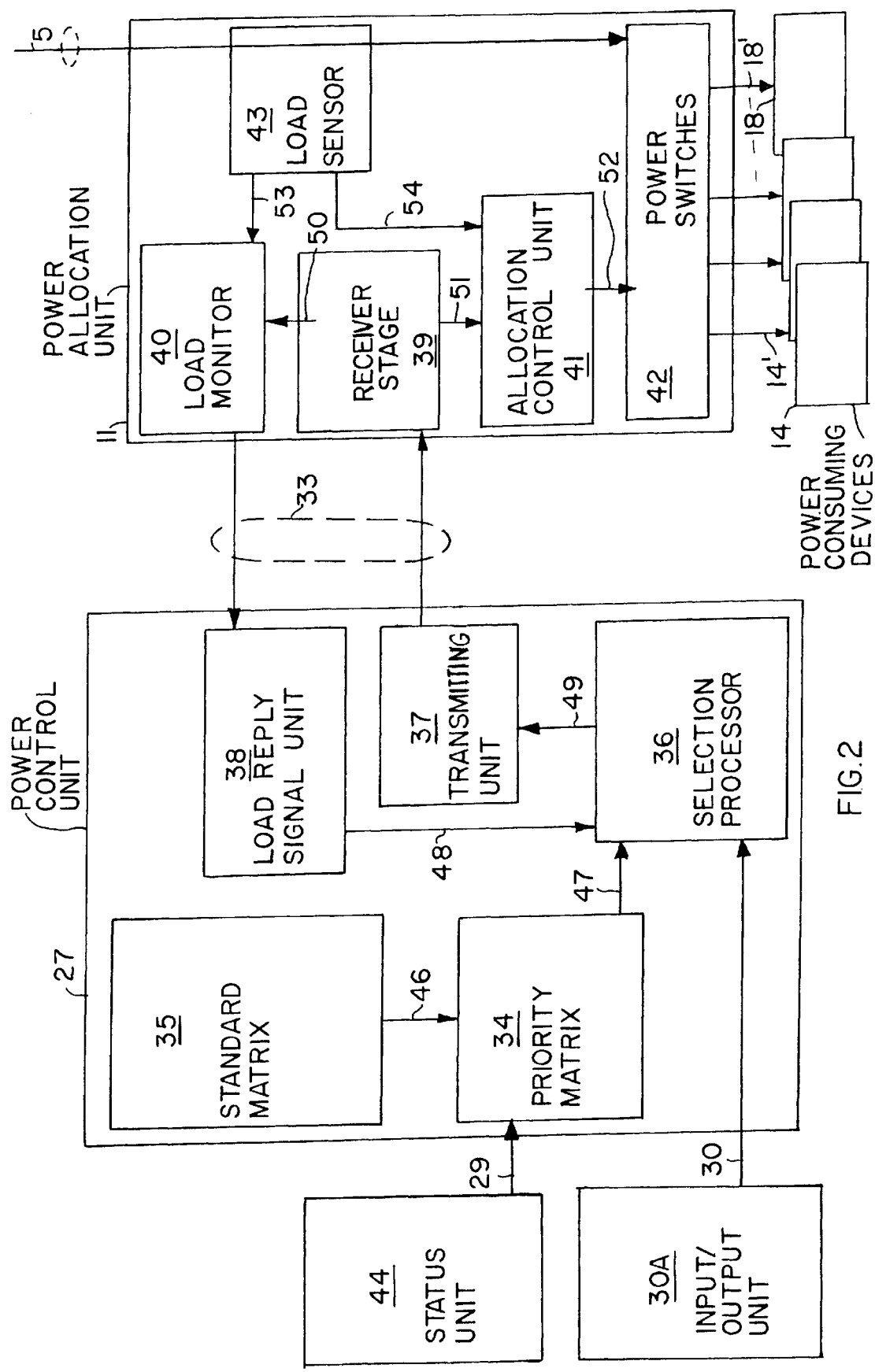
FIG. 2 is an enlarged block circuit diagram showing the internal details of the power control unit and one allocation unit as shown in FIG. 1.

FIG. 2 shows the internal circuitry of the power control unit 27 and of the allocation unit 11, within the present power distribution arrangement as shown in FIG. 1. The power control unit 27 carries out a central controlling function within the overall arrangement. To achieve this, the control unit 27 comprises a priority matrix 34, a standard matrix 35, a selection processor 36, a transmitting unit 37, and a load reply signal unit 38. The priority matrix 34 may be a standard permanent or programmable memory module that stores a list in which the various power consuming devices are arranged in the order of priority, e.g. based on the criticality of their function. On the input side, the priority matrix 34 is connected with a status unit 44 via the data line 29, and with the standard matrix 35 via a data line 46. On the output side, the priority matrix 34 is connected with the selection processor 36 via a line 47. The standard matrix may be a common permanent or programmable memory module that contains or stores data representing a standard configuration of the allocation of various power consuming devices with the respective power line strands. The status unit receives status information regarding the operating or malfunction status of the power sources and/or the power line strands from corresponding respective sensors 44a and 44b. Thus, the status unit 44 and the control unit 27 form means for evaluating the operating status of the power system and providing signals indicating such status.

Furthermore, the selection processor 36 receives information from the load reply signal unit 38 via a line 48. After processing the input signals, the selection processor 36 provides output signals over a line 49 to the transmitting unit 37, which in turn transmits respective corresponding digital signals to the allocation units 11 to 13 via the data bus 33.

The allocation unit 11 comprises a receiver stage 39 connected to the data bus 33, a load monitor 40, an allocation control unit 41, at least one power control switch device 42 such as a selectable power circuit breaker switch, and a load sensor 43. The receiver stage 39 receives the information and command signals via the data bus 33 and conveys these signals to the load monitor 40 and to the allocation control unit 41 via internal lines 50 and 51 respectively. The allocation control unit 41 in turn is connected via a data line 52 to the power switch 42, which has a plurality of outputs that are respectively connected to the individual power consuming devices 14 to 18. Moreover, the branch line 5, including the individual branch line conductors 5a to 5n which are respectively connected to the power line strands 1a to 1n, passes through the load sensor 43 and is connected to the power switch 42 to convey power thereto. The load sensor 43 senses the respective load condition on each one of the branch lines 5a to 5n and provides corresponding output signals via a line 53 to the load monitor 40 and via a line 54 to the allocation control unit 41.

The operation of the present system will now be described. When the present arrangement is placed into operation in the normal case, i.e. in a power distribution system without any malfunction or failure condition, then the allocation of the power supply to the individual power consuming devices will be configured according to the allocation command stored in the standard matrix 35. This allocation command corresponds to the particular allocation of power consuming devices to the various power line strands, which is optimal for the operation of a properly functioning, failure-free power generation and distribution system. To achieve this, the following functions are carried out within the power control unit 27.

The allocation configuration stored in the standard matrix 35 is conveyed in digital form to the priority matrix 34, in which is stored a list of the respective relative priority of each of the power consuming devices, and also the information provided by the power status unit 44. An integrated logic circuit evaluates the information provided by the status unit 44 to determine whether the information is reporting a normal failure-free operation of the power generating sources and of the power distribution system. If this is the case, then the priority matrix 34 will deliver corresponding signals to the selection processor 36, wherein these signals carry the command that the standard allocations stored in the standard matrix 35 should be used in the further operation of the system. The selection processor 36 further checks whether manually input allocation commands are present on the line 30, which would override the standard configuration for the allocations. If this is not the case, then the selection processor 36 will transfer the command received from the priority matrix 34 in practically unaltered form to the transmitting unit 37. On the other hand, if manual inputs provided over the line 30 override any aspect of the standard configuration, then the corresponding allocation signal will be appropriately revised by the selection processor 36 before being passed on to the transmitting unit 37.

The selection processor 36 further has the function of computationally determining the respective loadability of the individual power generating circuits, and establishing corresponding limit values. Namely, the allocation of power consuming devices to the respective power line strands will be limited or carried out so as not to exceed the power load limits on any given power line strand, as set by the selection processor 36. In turn, the transmitting unit 37 conveys the respective signals provided by the selection processor 36 into the data bus 33, after converting the signals into a digital format that is compatible for the particular type of data bus 33. Since a plurality of allocation units 11 to 13 are connected to the common data bus 33, the control signals respectively include appropriate address signals in addition to the control signals so that the transmitting unit 37 can particularly address each respective allocation unit and provide it with the proper individual allocation commands.

In each of the allocation units, for example the allocation unit 11 as shown in FIG. 2, the following functions are carried out once a signal has been received over the data bus 33. First, the signal is conveyed from the data bus 33 into the receiver stage 39, and is then pre-processed or prepared for the load monitor 40 and thereafter conveyed thereto. Simultaneously, signals are correspondingly transferred to the allocation control unit 41 which then generates concrete switching commands for the power switch 42 based on the respective received signals. Upon execution in the power switch 42, these switching commands result in a concrete allocation of the connections of the various power consuming devices 14 to 18 to the appropriate power line strands 1a to 1n via the branch lines 5a to 5n, as specified by the allocation configuration stored within the standard matrix 35.

During the operation of the system, the currently present actual load prevailing in each strand 5a to 5n of the branch line 5 is measured by the load sensor 43, and the corresponding measured values are conveyed to the load monitor 40 as well as the allocation control unit 41. The load monitor 40 processes these measured values to prepare them for the data bus 33 and thereupon transmits these back to the load reply signal unit 38. The allocation control unit 41 compares the load values received from the receiver stage 39 with the load values received from the load sensor 43, and then takes the comparison result into consideration when generating the switching commands for the power switch 42. If the load values measured by the load sensor 43 are within the respectively acceptable range, then the allocations provided by the standard matrix 35 are released for realization in the power switch 42. However, if any particular load value measured by the load sensor 43 exceeds the acceptable load limit, then the power switch 42 will disconnect a respective power consuming device from the overloaded power line strand, and instead connect it to a different power line strand, according to information provided by the priority matrix or manually input data in connection with the system information provided by the status unit 44.

The present apparatus is capable of logically reacting to any malfunction or failure of one or more of the power supply circuits, and thereby largely avoid device failures resulting from a power failure. For example, if the signals provided by the status unit 44 contain information indicating that one power supply circuit has failed due to failure of the respective power source or the power line strand, then the selection processor 36 will determine and generate signals for a new allocation in such a manner that all power consuming devices affected by the power failure will be reallocated and connected to the remaining operative power supply circuits, under consideration of the respective load limit values and priorities assigned to the respective devices. In this case, the allocation configuration stored in the standard matrix 35 is replaced by a configuration generated by the selection processor 36.

If the computations carried out by the selection processor 36 determine that the remaining total power available on the intact operating power supply circuits after the failure of one or more of the power supply circuits is insufficient for properly supplying power to all of the presently connected power consuming devices, then the respective power consuming device having the lowest priority as shown in the priority matrix 34 is switched off or disconnected. Then the total power consumption load is again compared to the available power supply, and if necessary, the next lowest priority device is also switched off, and so forth. Moreover, the respective power consuming devices are reallocated among the available power line strands, if necessary, to avoid overloading any one power line strand.

If the central control unit 27 itself fails due to some malfunction or breakdown then the operation of the present system is carried on in a decentralized manner on the basis of logic circuits integrated into the respective allocation units 11 to 13. This is achieved in that all of the data provided by the control unit 27 and particularly by the selection processor 36 are stored within the individual allocation control units 41, so that these data are still available after the failure of the control unit 27. The system then automatically reacts to any malfunction or failure of the power line 1 by means of a direct interaction between the load sensor 43 and the allocation control unit 41 via the line 54.

Figure 3:
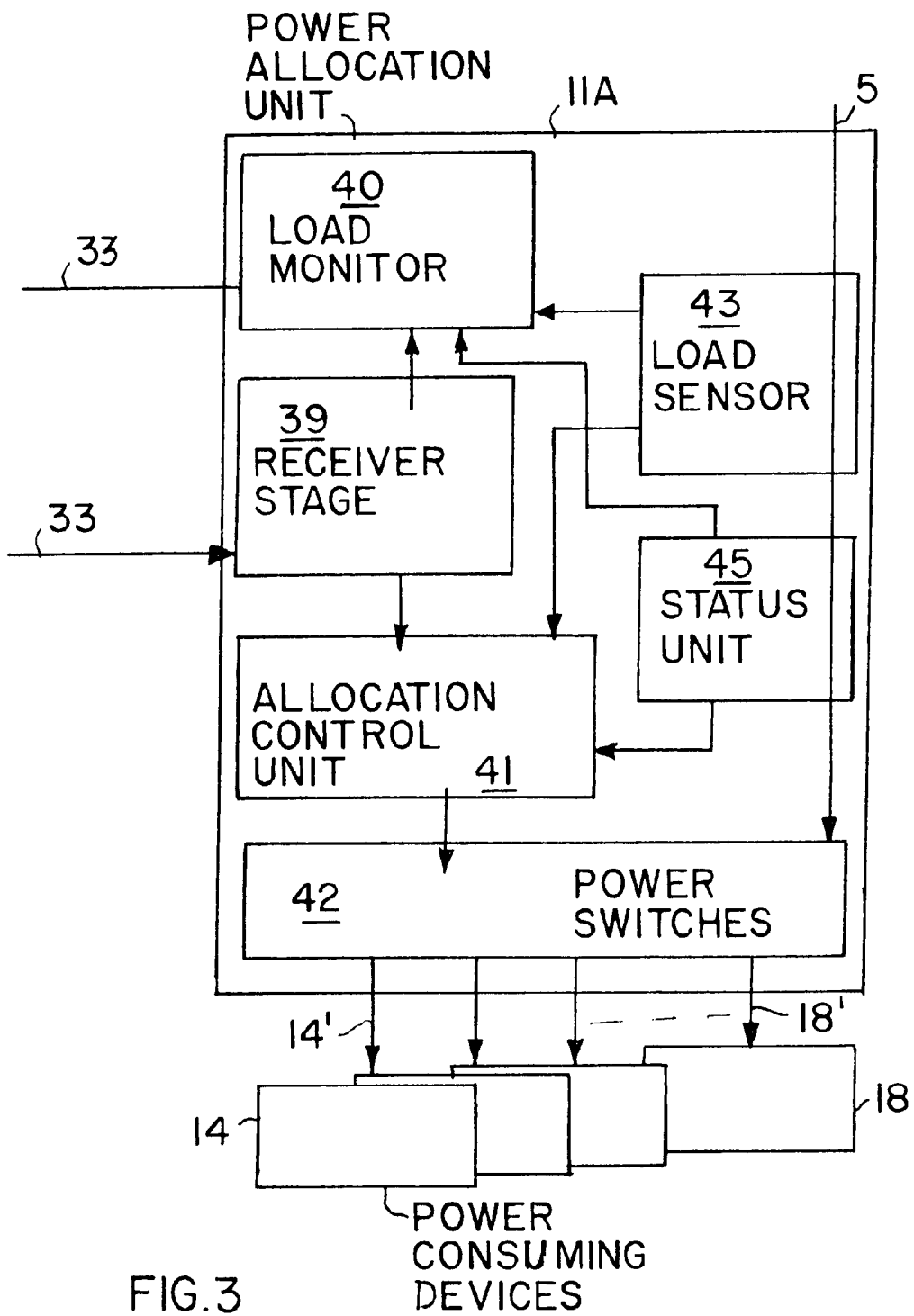
FIG. 3 is an enlarged block circuit diagram showing the details of an allocation unit including an integrated status unit.

FIG. 3 shows a particular embodiment of an allocation unit 11a according to the invention, which may represent the circuit arrangements of any one or all of the allocation units 11 to 13. This allocation unit 11a comprises a status unit 45 integrated therein. In comparison to the embodiment of FIG. 2, which uses an external status unit 44 rather than an integrated internal status unit 45, the present embodiment achieves the advantage that any malfunction or failure of the power line 1 itself or the branch line strands 5a to 5n, and not only a malfunction or failure of the power generation apparatus, can be determined and taken into account. In other respects, the allocation unit 11a shown in FIG. 3 corresponds to the arrangement and operation of the allocation unit 11 shown in FIG. 2. However, in the embodiment of FIG. 3, the strands 5a to 5n of the branch line 5 pass through and are monitored by the status unit 45. The status unit 45 provides corresponding data signals to the load monitor 40 and to the allocation control unit 41, such that any failure or lack of power on any one of the strands 5a to 5n of the branch line 5 can be immediately detected and taken into account internally in the respective allocation unit 11a. In the embodiment of FIG. 2, it is possible to take failures of the power line 1 into account by using external sensors connected to the external status unit 44.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A power distribution apparatus comprising:
   at least one power source,
   a power line including a plurality of individual power line strands connected to said at least one power source,
   at least one branch line including a plurality of individual branch line strands respectively connected to said individual power line strands at a power distribution point along a length of said power line,
   at least one power consumer group including a plurality of power consuming devices and a plurality of individual feeder lines respectively connected to said power consuming devices,
   at least one allocation unit connected to said plurality of individual branch line strands and thereby to said plurality of individual power line strands, and connected to said plurality of individual feeder lines and thereby to said plurality of power consuming devices, and adapted to selectively interconnect one or more respective ones of said feeder lines with respective selected ones of said branch line strands,
   a status unit connected with, and adapted to acquire and provide status data indicating an operating status of, at least one of said at least one power source, said power line strands, and said branch line strands, and
   a central power distribution control unit connected with said status unit to receive said status data therefrom, and a data bus connecting said control unit with said allocation unit,
   wherein said control unit is adapted to process said status data and correspondingly generate control commands onto said data bus, and
   wherein said allocation unit is adapted to receive said control commands from said data bus and, responsive to said control commands, to select ones of said branch line strands that are indicated as properly providing power based on said status data, for carrying out said selective interconnecting of one or more respective ones of said feeder lines with said respective selected ones of said branch line strands.

2. The apparatus according to claim 1, wherein, upon occurrence of a power failure as indicated by said status data, said allocation unit is adapted to disconnect any affected one or more of said feeder lines that were, before the occurrence of the power failure, interconnected with a respective inoperative one of said branch line strands affected by said power failure, and to newly interconnect said affected one or more of said feeder lines with one or more operative ones of said branch line strands that are not affected by said power failure.

3. The apparatus according to claim 1, comprising a plurality of said power consumer groups, and a plurality of said branch lines and a plurality of said allocation units respectively associated with respective ones of said plurality of power consumer groups, wherein said plurality of branch lines are respectively connected to said power line at a plurality of power distribution points arranged spaced from one another along said length of said power line.

4. The apparatus according to claim 1, comprising a plurality of independent ones of said at least one power source, wherein said plural power sources are respectively individually connected to ones of said plurality of power line strands.

5. The apparatus according to claim 1, wherein said individual power line strands are arranged circuit-parallel with one another.

6. The apparatus according to claim 1, wherein said at least one power source is an electrical power source, and said power line strands are individual electrical conductor cables.

7. The apparatus according to claim 1, wherein said power control unit comprises
   a standard matrix adapted to store standard information specifying a standard allocation for said allocation unit to responsively carry out said selective interconnecting of one or more respective ones of said feeder lines with respective selected ones of said branch line strands,
   a priority matrix connected to said standard matrix and adapted to store priority information specifying relative priorities of each of said power consuming devices,
   a selection processor connected to an output of said priority matrix,
   a transmitting unit connected to an output of said selection processor, connected to said data bus, and adapted to transmit said control commands onto said data bus, and
   a load reply signal receiving unit connected to said data bus, adapted to receive load reply signals therefrom, and connected to an input of said selection processor.

8. The apparatus according to claim 1, wherein said allocation unit comprises
   a receiver stage connected to said data bus and adapted to receive said control commands therefrom,
   a load monitor connected to said data bus and adapted to transmit load reply signals onto said data bus,
   an allocation control unit connected to an output of said receiver stage,
   a load sensor cooperating with said branch line strands so as to sense a power load on said branch line strands, and having respective outputs connected to respective inputs of said load monitor and said allocation control unit, and
   a power switch arrangement connected to an output of said allocation control unit, interposed and connected to and between said branch line strands and said feeder lines, and adapted to carry out said selective interconnecting of one or more respective ones of said feeder lines with respective selected ones of said branch line strands.

9. The apparatus according to claim 1, further comprising an operator input/output unit including an input keyboard and an output display screen, and an input line connecting said operator input/output unit with said power control unit.

10. The apparatus according to claim 1, wherein said status unit is incorporated and included within said allocation unit.

11. The apparatus according to claim 10, wherein said status unit includes a sensor connected to said branch line strands and is adapted to acquire and provide said status data directly indicating a respective operating status of said branch line strands.

12. The apparatus according to claim 1, wherein said status unit is separate from and not incorporated in said allocation unit, includes a sensor connected to said at least one power source, and is adapted to acquire and provide said status data indicating an operating status of said at least one power source.

13. The apparatus according to claim 1, wherein said apparatus is for a power system of an aircraft, and wherein said power consuming devices are selected from ovens, boilers, cooler boxes and refrigeration units installed in a galley of said aircraft.

14. An electrical power distribution system in an aircraft, said system comprising:

a plurality of power sources, a plurality of power line strands arranged parallel to one another over at least a portion of a length of said power line strands, and respectively connected to said plurality of power sources, at least one branch line including a plurality of individual branch line strands respectively connected to said power line strands at a power distribution point along said portion of said length of said power line strands, at least one power consumer group including a plurality of power consuming aircraft devices and a plurality of individual feeder lines respectively connected to said devices, first means for evaluating an operating status of at least one of said power sources, said power line strands, and said branch line strands, and for determining and providing signals that indicate whether electrical power is available respectively on each one of said branch line strands, second means connected to said first means for receiving said signals, and interposed between said branch line strands and said feeder lines for selectively interconnecting one or more respective ones of said feeder lines with respective selected operating ones of said branch line strands on which electrical power is available, dependent on and responsive to said signals.

15. A method for controlling a power distribution system including a plurality of power sources, a plurality of power line strands respectively connected to said power sources, a plurality of branch line strands respectively connected to said power line strands, a plurality of power consuming devices, a plurality of feeder lines respectively connected to said power consuming devices, a status evaluation unit adapted to evaluate an operating status of at least one of said power sources, said power line strands and said branch line strands, and a selective interconnection switching junction interposed and connected between said feeder lines and said branch line strands and adapted to selectively interconnect one or more respective ones of said feeder lines with respective selected ones of said branch line strands, said method comprising the following steps:

(a) using said status evaluation unit, evaluating the operating status of at least one of said power sources, said power line strands, and said branch line strands, and correspondingly providing a status signal indicating which active ones of said branch line strands have power being delivered thereto and which inactive ones of said branch line strands do not have power being delivered thereto, (b) using said switching junction, selectively interconnecting one or more of said feeder lines with at least a respective active one of said branch line strands that has power being delivered thereto and disconnecting all of said feeder lines from any respective inactive one of said branch line strands that does not have power being delivered thereto, responsively to said status signal.

16. The method according to claim 15, further comprising an initial step of selectively interconnecting one or more of said feeder lines with respective ones of said branch line strands in a standard interconnection allocation configuration, using said switching junction, based on stored information representing said standard connection allocation configuration.

17. The method according to claim 16, further comprising determining a total available power on all said active branch line strands, determining a total power load of all of said power consuming devices connected by said feeder lines to said active branch line strands, comparing said total power load with said total available power, and if said total power load exceeds said total available power then disconnecting from said respective active branch line said feeder line connected to a respective lowest priority one of said power consuming devices as indicated by stored priority data.

18. The method according to claim 16, further comprising determining an available power on each said active branch line strand, determining a cumulative power load of all of said power consuming devices connected by respective ones of said feeder lines to each respective one of said active branch line strands, comparing said cumulative power load with said available power respectively for each said active branch line strand, and if said cumulative power load exceeds said available power for any overloaded one of said active branch line strands then disconnecting a selected one of said feeder lines that was connected to said overloaded branch line strand and reconnecting said selected feeder line with a respective one of said active branch line strands for which said respective cumulative power load does not exceed said available power.

19. The method according to claim 16, further comprising receiving a manual input signal representing a selected connection allocation configuration, comparing said manual input signal with said stored information representing said standard connection allocation configuration, and if said selected connection allocation configuration differs from said standard connection allocation configuration then disconnecting and reconnecting said interconnections according to said selected connection allocation configuration using said selective interconnection switching junction.

* * * * *